United States Patent [19]
Lutz

[11] Patent Number: 6,126,195
[45] Date of Patent: Oct. 3, 2000

[54] GAS BAG MODULE FOR A VEHICLE OCCUPANT RESTRAINT SYSTEM

[75] Inventor: Joachim Lutz, Schechingen, Germany

[73] Assignee: TRW Occupant Restraint Systems GmbH & Co. KG, Alfdorf, Germany

[21] Appl. No.: 09/203,874

[22] Filed: Dec. 2, 1998

[30] Foreign Application Priority Data

Dec. 8, 1997 [DE] Germany .................. 297 21 643 U

[51] Int. Cl.⁷ .................................................. B60R 21/26
[52] U.S. Cl. .................. 280/737; 280/728.1; 280/728.3; 280/736; 280/741; 280/742
[58] Field of Search ............... 280/728.1, 728.2, 280/728.3, 731, 732, 736, 737, 740, 741, 742

[56] References Cited

U.S. PATENT DOCUMENTS

| | | |
|---|---|---|
| 3,797,853 | 3/1974 | Grosch et al. . |
| 4,773,673 | 9/1988 | Sakurai . |
| 5,217,244 | 6/1993 | Bauer ................................. 280/728.3 |
| 5,390,950 | 2/1995 | Barnes et al. ..................... 280/728.3 |
| 5,437,472 | 8/1995 | Kuretake et al. .................... 280/737 |
| 5,438,472 | 8/1995 | Kuretake et al. . |
| 5,564,742 | 10/1996 | Clarke et al. . |
| 5,899,488 | 5/1999 | Muller .............................. 280/728.3 |

FOREIGN PATENT DOCUMENTS

| | | |
|---|---|---|
| 2360315 | 5/1975 | Germany . |
| 4342492 | 7/1994 | Germany . |
| 06144137 | 5/1994 | Japan . |

*Primary Examiner*—Eric Culbreth
*Attorney, Agent, or Firm*—Tarolli, Sundheim, Covell, Tummino & Szabo L.L.P.

[57] ABSTRACT

A gas bag module for a vehicle occupant restraint system includes a module housing, a covering, a gas bag, a gas generator, and at least one device for opening the covering so that an opening results. The covering is opened in the case of restraint by the device even before inflow of gas into the gas bag and the gas bag unfolds through the resulting opening.

4 Claims, 2 Drawing Sheets

GAS BAG MODULE FOR A VEHICLE OCCUPANT RESTRAINT SYSTEM

TECHNICAL FIELD

The invention relates to a gas bag module for a vehicle occupant restraint system.

BACKGROUND OF THE INVENTION

In hitherto conventional gas bag modules, the covering is torn open by the unfolding gas bag and is then swung outwards. Before the tearing open, however, an enormous pressure occurs inside the gas bag, which stresses the gas bag fabric. In addition, this high internal pressure is disadvantageous for the subsequent unfolding process.

BRIEF SUMMARY OF THE INVENTION

The gas bag module according to the invention reduces the stress of the gas bag before the actual unfolding process and thereby improves the predeterminability of the unfolding process itself. The gas bag module according to the present invention comprises a module housing, a covering, a gas bag, a gas generator, and at least one device for opening the covering so that an opening results. The covering is opened in the case of restraint by the device even before inflow of gas into the gas bag, and the gas bag unfolds through the resulting opening.

Preferably, the device is constructed so that only when the covering is completely opened, gas can flow into the gas bag. Hence the gas bag remains pressureless as long as the covering is closed. The resistance of the covering to its tearing and opening has no effect on the unfolding of the gas bag. The unfolding of the gas bag itself therefore takes place substantially more easily and more quickly than in known gas bags. Thereby, also a smaller thermal stressing of the gas bag fabric is produced during the unfolding process.

According to an embodiment, a device is provided which shuts off the gas stream to the gas bag until the covering is opened. This device can be constructed as a separate device or else combined with the device for opening the covering.

Preferably, the gas generator itself is at least part of the device for opening the covering. Here, the housing of the gas generator can have at least one section which changes its position on activation of the gas generator. Through the change in position, the opening of the covering is then brought about directly or indirectly. In so doing, the movement of the section can be transferred directly to the covering or indirectly via holding pieces, connected with the covering, for the purpose of opening the latter.

It is possible that the gas generator as a whole moves as a result of its activation, for example through the repulse which is brought about by gas emerging from the gas generator. The covering is then opened by the displacement.

In addition, the gas generator can change its external geometry upon its activation. The covering is then opened by this change in geometry. The change in the external geometry can take place on the one hand for example by a partial expansion of the outer housing or, on the other hand, by a movement of housing parts, which are displaceable with respect to each other and form the outer housing. This displacement of the housing parts takes place owing to the internal pressure in the outer housing of the gas generator.

One aspect of the invention accordingly consists in that the flow path of the gas, produced in the gas generator, into the gas bag is not released immediately, but rather the internal pressure of the gas bag is utilized in order to firstly open the covering.

If several housing parts are provided which are movable with respect to each other, these are preferably pushed apart by the internal pressure on activation. The housing parts act either directly or indirectly on the covering. The displacement of the housing parts can lead to the release of the gas stream for the unfolding of the gas bag. For example, the housing parts can form a valve or can be connected with a valve which only permits an inflow of the gas into the gas bag when a predetermined displacement path is reached.

One of the displaceable housing parts is preferably constructed as a diffusor cap. According to one embodiment, the diffusor cap is moved towards the covering in order to open the covering. Subsequently, the diffusor cap can be moved away from the covering into the module. Thereby, in the case of a secondary impact of a vehicle occupant onto the outer housing of the gas generator, the diffusor cap can move and hence reduce the risk of injury.

DETAILED DESCRIPTION OF THE PREFERRED EMBODIMENTS

Figure 1:
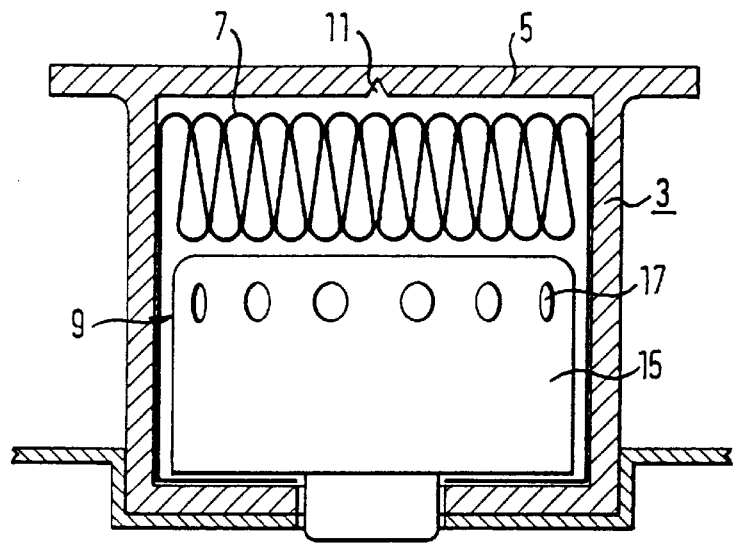
FIG. 1 shows a longitudinal section through a first embodiment of the gas bag module according to the invention, with the covering closed.

In FIG. 1 a gas bag module is shown, which is accommodated in the hub of a vehicle steering wheel. The gas bag module has a cup-shaped module housing 3 which is closed by a covering 5 secured to it. Inside the module housing 3 a folded gas bag 7 is accommodated, in which a gas generator 9 is arranged. The covering 5 has a predetermined breaking point formed by a constriction 11.

The gas generator 9 has an outer housing which consists of several housing parts inserted into each other in the manner of a telescope. A first, cup-shaped housing part 13 forms a lower part of the outer housing and a second cup-shaped housing part 15 placed onto the first housing part 13 forms an upper part. The second housing part 15 is constructed here as a diffusor cap and has numerous gas outlet openings 17 on its periphery in the region of the upper end. A propellant charge arranged in the interior of the gas generator 9 is not shown.

Figure 2:
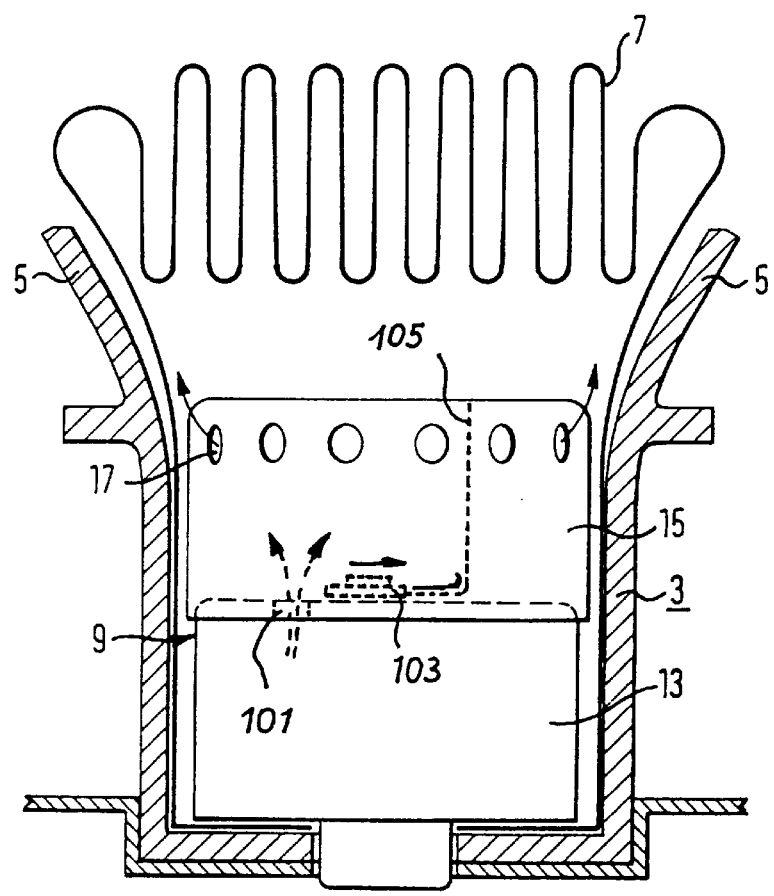
FIG. 2 shows the module shown in FIG. 1, at the start of the unfolding process with the covering opened.

In the case of restraint, this propellant charge is ignited and a high internal pressure is created in the outer housing of the gas generator 9 by the resulting gas. However, the gas can not flow out. Inside the outer housing in fact a dividing wall defined by an upper face wall of the cylindrical housing 13, having through-flow openings, is provided which is connected with the first housing part 13. opening 101 symbolizes the plurality of through-flow openings. The through-flow openings are, however, closed by a slide valve which is connected with the second housing part 15 by a rope 105, in the position shown in FIG. 1. The internal pressure in the outer housing leads to the second housing part 15 being displaced upwards, pressing against the gas bag 7 and thereby leading to the tearing and opening of the covering 5. Only when a predetermined displacement path is reached, the slide valve 103 opens the through-flow openings 101 in the dividing wall by being displaced to the right side. Then gas can flow into the gas bag 7 via the openings 17 and can unfold the gas bag 7, as shown in FIG. 2. The thus constructed gas generator forms a device for opening the covering and, in its interior through the slide valve provided, a device which shuts off the gas flow until the covering 5 is opened. The slide valve is coupled to the movement of the housing parts 13, 15 with respect to each other. This coupling can take place so that gas can only flow into the interior of the gas bag 7 when the covering 5 is completely opened, or already shortly after the covering 5 is torn open. In the latter case, the unfolding gas bag 7 then still contributes somewhat to the movement outwards of the torn covering 5. The resistance which the covering offers to the unfolding process in this case is, however, relatively low compared with the resistance which the not yet torn covering 5 would offer to the unfolding process of the gas bag.

Through the thus constructed gas bag module, the gas bag 7 is pressureless until the covering 5 is opened or is completely open. The tearing resistance of the covering and also its mass inertia on opening do not have a negative influence on the unfolding of the gas bag. As a result of this, the gas bag can unfold easily, in a relatively precisely predeterminable manner and quickly.

The radial inflow of the compressed gas is achieved by the raised diffusor cap in the form of the second housing part 15. In the case of a secondary impact or, if the occupant were to penetrate the inflated gas bag 7, the second housing 15 can be pushed in a damped manner deeper into the module again, onto the first housing part 13, which reduces the risk of injury.

Figure 3:
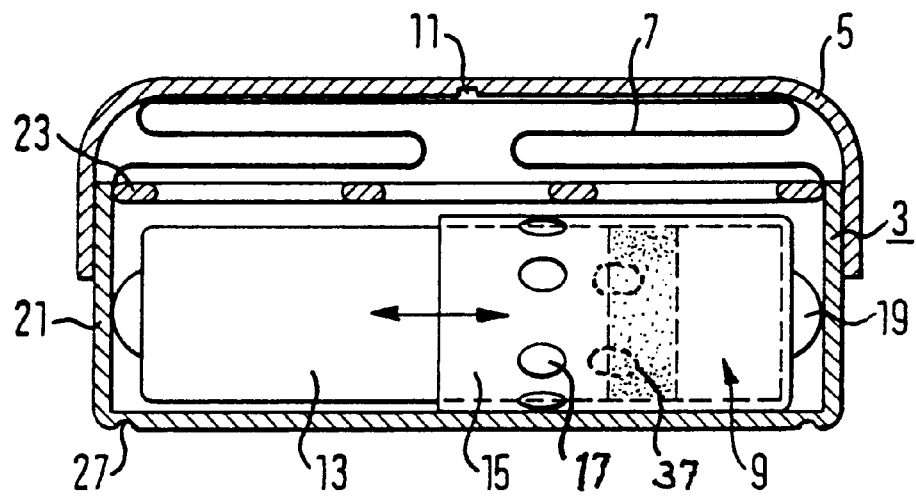
FIG. 3 shows a longitudinal sectional view through a second embodiment of the gas bag module according to the invention with the covering closed.

In the embodiment shown in FIG. 3, the gas generator 9 is constructed as a tubular gas generator. In this embodiment, however, the gas generator 9 is arranged outside the gas bag 7. The outer housing has on each of its end faces a convex extension 19 which lies against the inner face of the side walls 21 of the module housing 3. A holding ring 23 with through-flow openings serves for the fastening of the gas bag 7 in the module. The walls serve as holding pieces for the covering 5, which is curved in construction. Constrictions 27 on the transition between the base of the module housing 3 and the side walls 21 serve as hinges.

Figure 4:
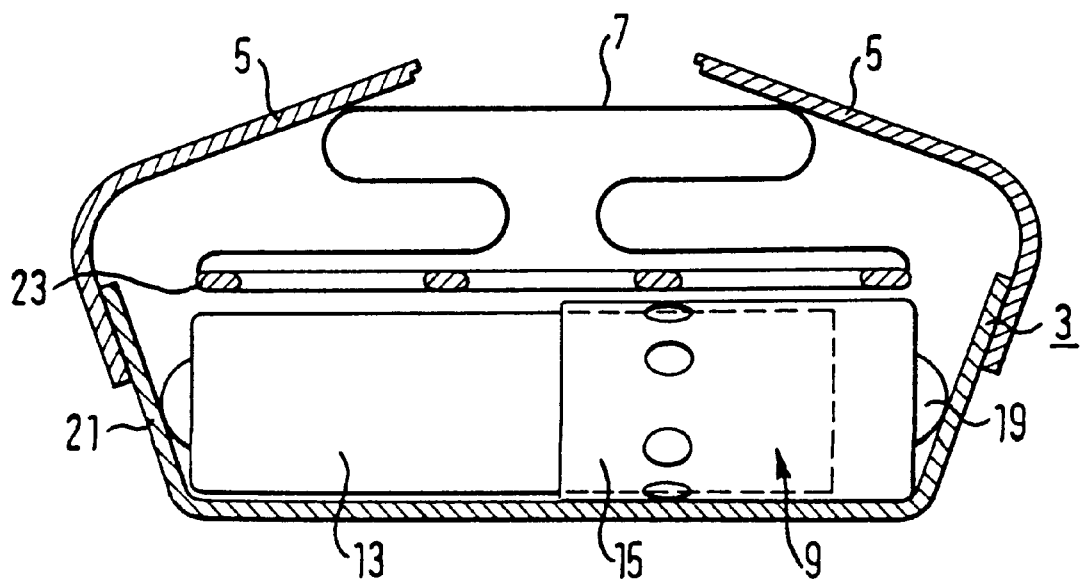
FIG. 4 shows the module shown in FIG. 3 at the start of the unfolding process, with the covering in the process of opening.

In the case of restraint, a high internal pressure is produced in the generator by means of the produced gas, which pressure leads to the pushing apart of the housing parts 13, 15. Thereby, the covering 5 is opened and swivelled outwards together with the holding pieces, as is shown in FIG. 4. The shell of the first housing part 13 has openings 37 which are aligned with the outlet openings 17 upon pushing apart the housing parts 13, 15, which parts define a valve. When the covering 5 is opened and the formed segments of the covering are swivelled about a certain angle, the flow path of the gas is freed, so that it can flow into the gas bag 7 and unfolds it. The unfolding gas bag 7 then opens the covering 5 wide, without a great resistance being offered to the opening process.

What is claimed is:

1. A gas bag module for a vehicle occupant restraint system comprising:

a module housing, a covering for said housing, a gas bag in said housing, and an adjustable gas generator in said housing and providing inflation fluid for inflating said gas bag, said gas generator having two overlapping cup-shaped housing parts placed one into the other, at least one of said parts moving relatively to the other on activation of said gas generator, said at least one of said housing parts comprising a device for opening the covering so that an opening results in said covering through which said gas bag unfolds, wherein said gas can only flow into said gas bag when said covering is opened.

2. A gas bag module for a vehicle occupant restraint system comprising:

a module housing, a covering for said housing, a gas bag in said housing, and an adjustable gas generator in said housing and providing inflation fluid for inflating said gas bag, said gas generator having two overlapping cup-shaped housing parts placed one into the other, at least one of said parts moving relatively to the other on activation of said gas generator, said at least one of said housing parts comprising a device for opening the covering so that an opening results in said covering through which said gas bag unfolds; and at least one valve which blocks said gas flow to said gas bag until said covering is opened.

3. A gas bag module for a vehicle occupant restraint system comprising:

a module housing, a covering for said housing, a gas bag in said housing, and an adjustable gas generator in said housing and providing inflation fluid for inflating said gas bag, said gas generator having two overlapping cup-shaped housing parts placed one into the other, at least one of said parts moving relatively to the other on activation of said gas generator, said at least one of said housing parts comprising a device for opening the covering so that an opening results in said covering through which said gas bag unfolds, wherein said two housing parts of said gas generator move as a result of activation of the gas generator, and said covering is opened by said movement of said two housing parts.

4. A gas bag module for a vehicle occupant restraint system comprising:

a module housing, a covering for said housing, a gas bag in said housing, and an adjustable gas generator in said housing and providing inflation fluid for inflating said gas bag, said gas generator having two overlapping cup-shaped housing parts placed one into the other, at least one of said parts moving relatively to the other on activation of said gas generator, said at least one of said housing parts comprising a device for opening the covering so that an opening results in said covering through which said gas bag unfolds, wherein said movement of said at least one housing part takes place laterally to said covering.

* * * * *